US006754451B1

(12) United States Patent
Nakamura

(10) Patent No.: US 6,754,451 B1
(45) Date of Patent: Jun. 22, 2004

(54) INFRARED TRANSMISSION/RECEPTION APPARATUS AND INFRARED TRANSMISSION/RECEPTION METHOD

(75) Inventor: Yoshitaka Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 09/589,793

(22) Filed: Jun. 8, 2000

(30) Foreign Application Priority Data

Jun. 8, 1999 (JP) ........................................... 11/161589

(51) Int. Cl.[7] ............................................... H04B 10/00

(52) U.S. Cl. ....................... 398/135; 398/137; 398/138; 398/115; 398/182; 398/197; 398/202; 398/213; 398/140; 398/118; 398/120; 340/825.72; 340/825.69; 340/825.44; 340/825.22; 455/38.3; 455/522; 455/41.2; 455/41.3

(58) Field of Search ................................ 398/135, 137, 398/138, 115, 197, 182, 202, 213, 140, 118, 120; 455/38.3, 522, 41.2, 41.3; 340/825.72, 825.69, 825.22, 825.44

(56) References Cited

U.S. PATENT DOCUMENTS

| | | | | | |
|---|---|---|---|---|---|
| 5,517,608 | A | * | 5/1996 | Suzuki et al. | 359/161 |
| 5,822,099 | A | | 10/1998 | Takamatsu | |
| 5,907,418 | A | * | 5/1999 | Walczak et al. | 359/142 |
| 6,104,512 | A | * | 8/2000 | Batey, Jr. et al. | 359/152 |
| 6,525,854 | B1 | * | 2/2003 | Takahashi et al. | 359/143 |
| 6,563,618 | B1 | * | 5/2003 | Morrow et al. | 359/152 |

FOREIGN PATENT DOCUMENTS

| | | | |
|---|---|---|---|
| EP | 0641095 | A1 | 3/1995 |
| EP | 0920151 | A1 | 6/1999 |
| GB | 2345213 | A | 6/2000 |
| JP | B2 63-36540 | | 7/1988 |
| JP | 2-1630 | | 1/1990 |
| JP | 7202817 | | 8/1995 |
| JP | A 7-312610 | | 11/1995 |
| JP | 8102715 | | 4/1996 |
| JP | 8-139685 | | 5/1996 |
| JP | 9-83443 | | 3/1997 |
| JP | 9172409 | | 6/1997 |
| JP | A 10-51392 | | 2/1998 |
| JP | A 10-107800 | | 4/1998 |
| JP | 10-200479 | | 7/1998 |
| JP | A 11-17613 | | 1/1999 |
| JP | A 11-112431 | | 4/1999 |
| JP | A 11-154916 | | 6/1999 |
| JP | A 11-261379 | | 9/1999 |
| JP | A 2000-261623 | | 9/2000 |
| JP | A 2000-295179 | | 10/2000 |
| WO | WO 9953632 | | 10/1999 |

* cited by examiner

*Primary Examiner*—Leslie Pascal
*Assistant Examiner*—Hanh Phan
(74) *Attorney, Agent, or Firm*—Young & Thompson

(57) ABSTRACT

An infrared transmission/reception apparatus and a method thereof in which an infrared transmission output is changed to transmit a plurality of station finding commands, and an infrared transmission output for such a station finding command out of the plurality of station finding commands as returning a station finding response from a secondary station is used to perform a subsequent communication. Thus, communication can be performed with the minimum infrared output regardless of the opposite apparatus.

5 Claims, 14 Drawing Sheets

INFRARED TRANSMISSION/RECEPTION APPARATUS AND INFRARED TRANSMISSION/RECEPTION METHOD

BACKGROUND OF THE INVENTION

1. Field of the Invention

The present invention relates to an infrared transmission/reception apparatus and an infrared transmission/reception method, particularly to an infrared transmission/reception apparatus which uses a data link protocol IrLAP (IrDA Link Access Protocol) standardized by industrial corporation IrDA (Infrared Data Association) and performs infrared communication and a transmission/reception method utilizing the apparatus.

2. Description of the Prior Art

Infrared communication has heretofore been known in which infrared light is used to perform communication among apparatuses. According to the infrared communication, for a distance of about 1 m from a communication object the communication can be performed without performing connection via a cable, and the like, which is convenient for use, and which provides an advantage that the communication can be realized with a simple constitution as compared with the communication using radio waves. From such advantage, the infrared communication is preferably applied to small apparatuses such as a note type personal computer and a portable information terminal.

Additionally, the small apparatus provided with the infrared communication function is in many cases operated by a battery incorporated inside so that it is convenient when a user carries it during movement, and it is preferable that power consumption be minimized also to lengthen the continuous operation possible time of the small apparatus. Therefore, it is preferable to suppress even the intensity of the infrared light radiated during data transmission in the infrared communication to the minimum, and to reduce the power consumption.

In the apparatus provided with a conventional infrared communication function, however, the infrared light with a constant intensity is constantly radiated regardless of the communication distance. Therefore, when the communication distance is short, the infrared light with an excessive intensity is radiated, and power is consumed more than necessary. Conversely, when the communication distance is long, no infrared light with a necessary intensity is radiated, and there is a possibility that communication cannot be performed.

As the conventional infrared transmission/reception apparatus for solving the problem, the apparatuses disclosed in Japanese Patent Application Laid-Open Nos. 83443/1997 and 299479/1998 are known.

The apparatus disclosed in the Japanese Patent Application Laid-Open No. 83443/1997 controls a driver to drive a light emitting LED based on the size of a noise component in a received signal, so that the current flowing through the light emitting LED and the infrared transmission intensity are controlled.

Moreover, the apparatus disclosed in the Japanese Patent Application Laid-Open No. 200479/1998 first radiates the infrared light with a maximum intensity, gradually lowers the intensity when an opposite apparatus can perform communication without any reception error, and performs the communication with an optimum radiation intensity without generating any reception error in the opposite apparatus.

Additionally, the infrared communication is standardized by IrDA standard, and the apparatuses conforming to the standard can mutually perform data communication by the infrared light. In the IrDA standard the protocol regarding the infrared communication is divided into a plurality of layers and defined, and in the IrLAP which is one of the plurality of layers the protocol is defined to establish a communication link between the apparatuses.

In the infrared transmission/reception apparatus which conforms to the IrDA standard, a calling side apparatus (hereinafter referred to as the "primary station") transmits a station finding command, an apparatus which can receive this station finding command and perform communication (hereinafter referred to as the "secondary station") transmits a station finding response to indicate its presence, and subsequently the primary station and secondary station start the infrared communication.

In the conventional infrared transmission/reception apparatus which conforms to the IrDA standard, the infrared communication intensity is always set to be constant. For example, when the primary station transmits the station finding command with the constant intensity and no station finding response is returned, it is judged that there is no apparatus able to perform the infrared communication nearby and the infrared communication is discontinued.

Additionally, Japanese Patent Application Laid-Open No. 1630/1990 discloses a remote operation apparatus which is not the infrared transmission/reception apparatus for performing data transmission/reception, but which remotely operates an air conditioner, and the like by the infrared light. This remote operation apparatus is constituted to raise the infrared communication intensity when no response information can be received from the operation objects such as the air conditioner.

The above-described conventional apparatus has the following problems.

First, in the apparatus disclosed in Japanese Patent Application Laid-Open No. 83443/1997, only the size of the noise component of the received signal is used as a parameter, and it is not defined whether the received signal can be recognized as data or not. Therefore, with the infrared communication intensity determined based on the size of the noise component, a state in which data communication is sufficiently enabled without any communication error cannot possibly be obtained.

Specifically, in the apparatus disclosed in the Japanese Patent Application Laid-Open No. 83443/1997, it is very difficult to obtain the relation between the size of the noise component and the infrared communication intensity to be used, and the apparatus is disadvantageously impractical.

Moreover, for the apparatus disclosed in the Japanese Patent Application Laid-Open No. 200479/1998, the opposite apparatus requires a function of detecting a communication error and transmitting error information, and there is a problem that general-purpose properties are lacking. Since the infrared light is necessarily transmitted first with a maximum intensity during communication start, there is also a problem that the power consumption increases in some cases.

Furthermore, in the conventional infrared transmission/reception apparatus which conforms the IrDA standard, since the infrared communication intensity is always set to be constant, there is a problem that in some state the infrared light with the excessive intensity is radiated and the power consumption is consumed more than necessary.

Additionally, the apparatus disclosed in the Japanese Patent Application Laid-Open No. 1630/1990 is the remote operation apparatus for operating the air conditioner, and the like, is basically a one-directional communication apparatus which transmits instructions to the operation object apparatuses such as the air conditioner in one direction, and is fundamentally different from the infrared transmission/reception apparatus whose object is a bidirectional data communication.

SUMMARY OF THE INVENTION

The present invention has been made in view of the above-described problems, and an object thereof is to provide an infrared transmission/reception apparatus which can perform communication with a required minimum infrared output regardless of an opposite apparatus and an infrared transmission/reception method.

In order to attain the above-described object, according to the present invention, there is provided an infrared transmission/reception apparatus which can function alone without depending on a communication object and which can perform transmission output level control.

According to the present invention, to attain the above-described object, there is provided an infrared transmission/reception apparatus which uses the station finding command of a data link protocol "IrLAP" standardized by a standardization corporation IrDA, and which can function alone and perform the transmission output level control.

Specifically, according to the present invention, in a primary station of an infrared communication system of IrDA standard in which a secondary station transmits a station finding response to a station finding command from the primary station, an infrared transmission output is changed to transmit a plurality of station finding commands, the infrared transmission output is used when the plurality of station finding commands to which the station finding response is returned from the secondary station are transmitted, and the subsequent communication is performed. According to this constitution, in the primary station of the infrared communication system, a minimum infrared transmission output can be selected in a communicable range, and the infrared transmission output can be reduced.

Moreover, according to the present invention, in a secondary station of an infrared communication system of IrDA standard in which the secondary station transmits a station finding response to a station finding command from a primary station, the station finding response is transmitted via a predetermined infrared transmission output during reception of the station finding command, a processing of successively raising the infrared transmission output and transmitting the station finding response with respect to the resent station finding command is repeated when no response is returned from the primary station with respect to the station finding response, the infrared transmission output is used when the response is returned from the primary station with respect to the station finding response, and the subsequent communication is performed. According to this constitution, in the secondary station of the infrared communication system, the minimum infrared transmission output can be selected in the communicable range, and the infrared transmission output can be reduced.

In other words, according to the present invention, since the electric current value can automatically be set to the value with which the infrared communication can normally be performed by increasing/decreasing the current flowing through the light emitting element in a stepwise manner, regardless of the communication distance, the power consumed in the light emitting element for transmitting the infrared data can be minimized regardless of the communication distance in a range in which the infrared communication can constantly and normally be performed.

Further, in the present invention, since the station finding command and station finding response defined by the heretofore standardized IrDA standard are used to perform the control for adjusting the transmission output, the type of the opposite apparatus is not limited, no large-scaled change is made from the conventional infrared communication system, and superior practicability is provided.

Still further, in the present invention, since the primary station receives the station finding response, and employs the output level for securely performing the communication, the securement of the output level adjustment is effectively high.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 3A shows the constitution of the infrared data transmitted from the light emitting element, and FIG. 3B is a diagram showing the constitution of the data part of the infrared data shown in FIG. 3A;

DETAILED DESCRIPTION OF THE PREFERRED EMBODIMENTS

A preferred embodiment of the present invention will now be described hereinafter with reference to the accompanying drawings.

Figure 1:
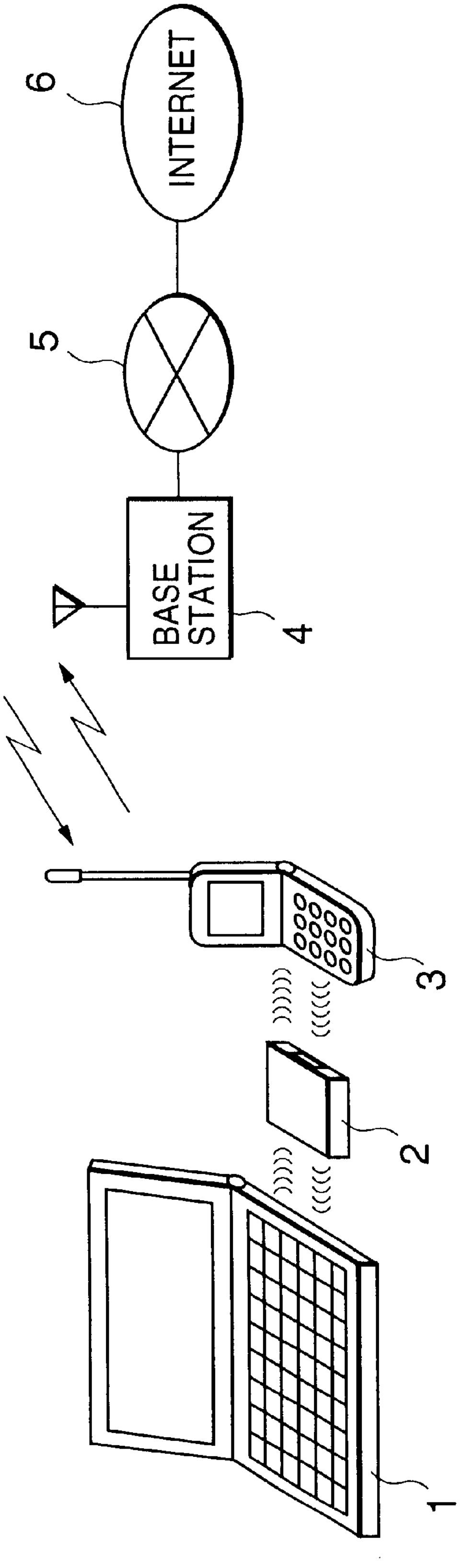
FIG. 1 is a schematic view showing one example of an environment to which the infrared transmission/reception apparatus of the present invention is applied.

FIG. 1 is a schematic view showing one example of an environment to which an infrared transmission/reception apparatus of the present invention is applied.

In FIG. 1, a personal computer 1 performs a bidirectional infrared communication with a communication adapter 2, and the communication adapter 2 performs the bidirectional infrared communication with a cellular phone 3. The communication adapter 2 is an apparatus which serves as an interface of the data handled by the personal computer 1 and the data handled by the cellular phone 3, and may be disposed inside the personal computer 2 or inside the cellular phone 3.

Moreover, the cellular phone 3 is connected to Internet network 6 via a base station 4 and a public network 5 connected via radio.

In this example, according to the constitution shown in FIG. 1, the Internet can be connected and accessed from the personal computer 1.

In the environment shown in FIG. 1, the infrared transmission/reception apparatus of the present invention can be applied to the personal computer 1 for performing the infrared communication, communication adapter 2 and cellular phone 3.

Additionally, in the example shown in FIG. .1, Internet connection is performed from the personal computer 1 via the cellular phone 3, but the environment to which the infrared transmission/reception apparatus of the present invention is applied is not limited to this, for example, the cellular phones may mutually perform the infrared communication to perform data exchange between the cellular phones, and the personal computers may perform the communication with each other by disposing the constitution similar to the personal computer 1, communication adapter 2 and cellular phone 3, instead of the base station 4, public network 5 and Internet network 6 of FIG. 1.

Figure 2:
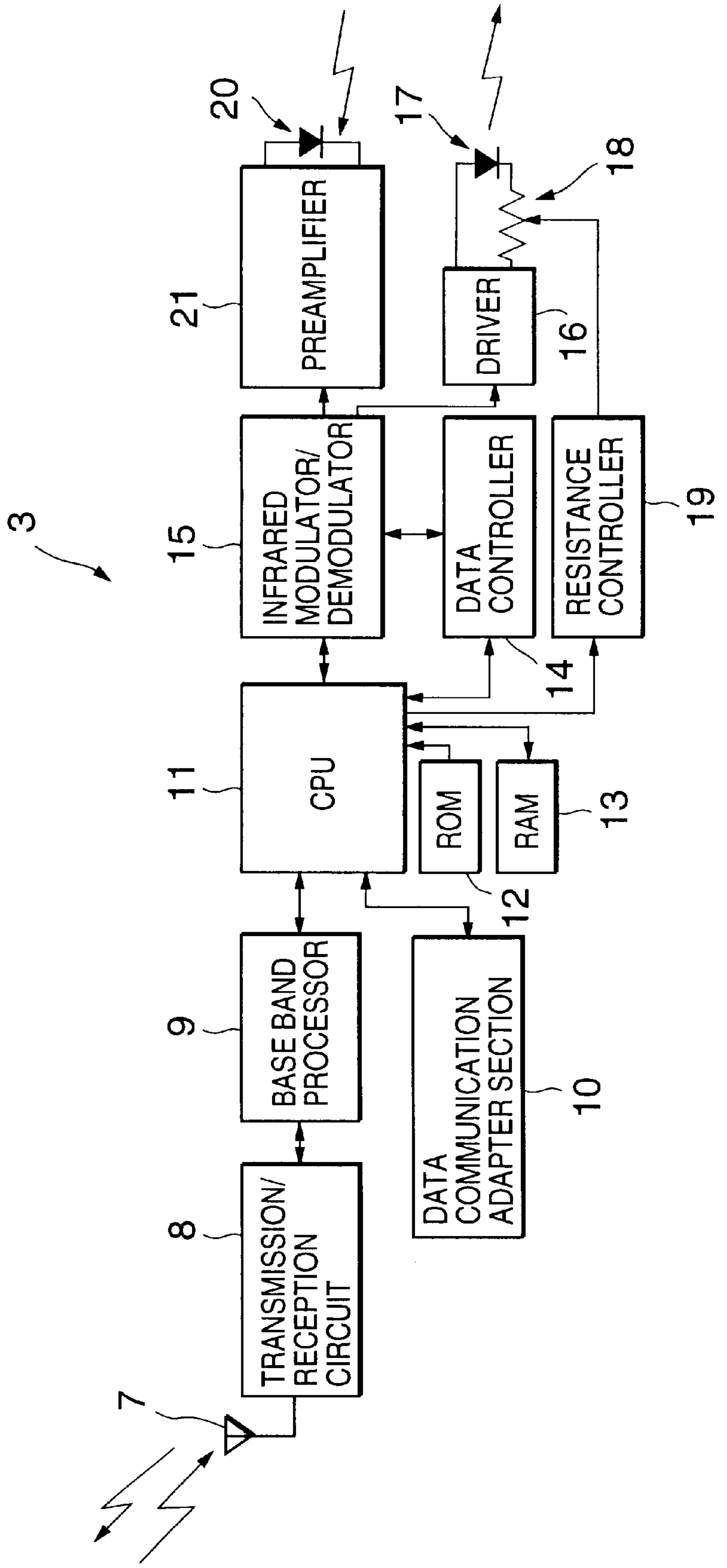
FIG. 2 is a block diagram showing the constitution of one embodiment of the infrared transmission/reception apparatus according to the present invention.

FIG. 2 is a block diagram showing the constitution of an embodiment of the infrared transmission/reception apparatus according to the present invention.

This embodiment is an example in which the infrared transmission/reception apparatus of the present invention is applied to the cellular phone, and relates to the cellular phone 3 which, as shown in FIG. 1, receives data from the personal computer 1 via the communication adapter 2 by the infrared light, transmits this received data to the base station via radio waves, receives the radio waves from the base station, and transmits the received radio wave data to the personal computer 1 via the communication adapter 2 by the infrared light.

Referring to FIG. 2, the cellular phone 3 comprises: an antenna 7 for transmitting/receiving the radio waves from the base station 4; a transmission/reception circuit 8 for performing transmission/reception with respect to the antenna 7; a base band processor 9 for performing mutual conversion between a high frequency in the transmission/reception by the radio waves and a bit string in the infrared communication; a data communication adapter section 10 for converting the data to be transmitted to a data format suitable for a communication type; a CPU 11 for controlling a communication processing; a ROM 12 for storing various parameters, software, and the like for use in the CPU 11; a RAM 13 for temporarily storing various parameters, and the like for use in the CPU 11; a data controller 14 for performing a data processing in accordance with a command from the CPU 11; an infrared modulator/demodulator 15 for performing modulation/demodulation in the infrared communication; a driver 16 for allowing a light emitting element 17 to emit light based on the modulated infrared data from the infrared modulator/demodulator 15; the light emitting element 17 for transmitting the infrared light; a variable resistor 18 for adjusting the output of the light emitting element 17; a resistance controller 19 for controlling the resistivity of the variable resistor 18; a light receiving element 20 for receiving the infrared light; and a preamplifier 21 for amplifying the infrared data received by the light receiving element 20 and transferring the data to the infrared modulator/demodulator 15.

Here, the operation of the cellular phone 3 will be described.

As shown in FIG. 2, the cellular phone 3 is provided with the light receiving element 20 and light emitting element 17, and can communicate with the outside by the infrared light through these elements. The light receiving element 20 is, for example, a photo-diode, and the light emitting element 17 is, for example, an LED.

The light receiving element 20 is connected to the infrared modulator/demodulator via the preamplifier 21, and the light emitting element 17 is connected to the infrared modulator/demodulator 15 via the driver 16. The transmitted/received infrared light is modulated/demodulated by the infrared modulator/demodulator 15, and the data controller 14 having received a command from the CPU 11 processes light as data.

When the CPU 11 judges based on a processing described later that the output transmitted from the light emitting element 17 is excessive, the resistance controller 19 having received the command from the CPU 11 raises the resistivity of the variable resistor 18 by a predetermined value, and reduces the current flowing through the light emitting element 17, that is, reduces the infrared transmission output.

Conversely, when the CPU 11 judges that the output transmitted from the light emitting element 17 is insufficient, the resistance controller 19 having received the command from the CPU 11 lowers the resistivity of the variable resistor 18 by the predetermined value, and increases the current flowing through the light emitting element 17, that is, increases the infrared transmission output.

After the intensity of the infrared transmission output by the light emitting element 17 is determined in this manner, the infrared communication is performed by the transmission output.

Figures 3A, 3B:
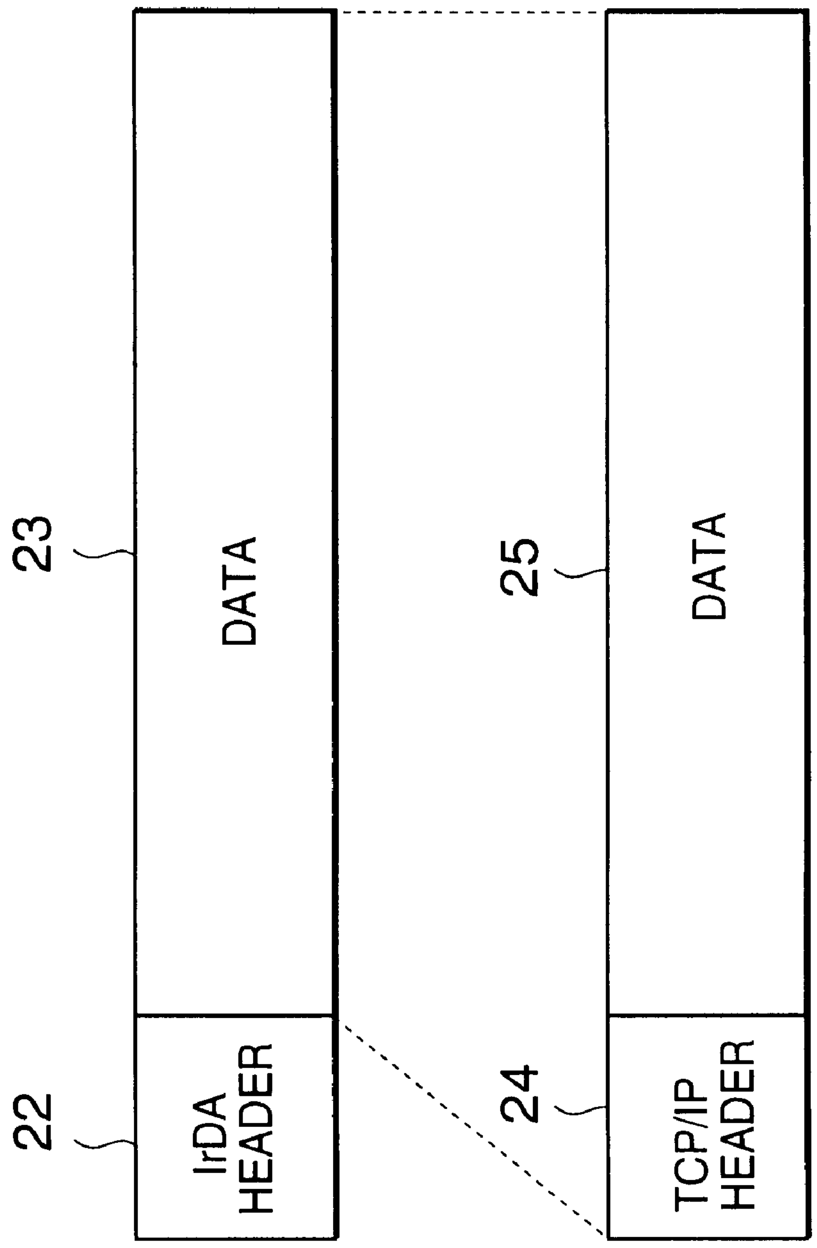
FIGS. 3A and 3B are schematic diagrams of the format of infrared data transmitted from the light emitting element shown in FIG. 2 after the infrared communication is started.

FIGS. 3A and 3B are a schematic diagram of the format of infrared data transmitted from the light emitting element 17 shown in FIG. 2 after the infrared communication is started. FIG. 3A shows the constitution of the infrared data transmitted from the light emitting element 17, and FIG. 3B is a diagram showing the constitution of a part of data 23 among the infrared data of FIG. 3A.

As shown in FIG. 3A, the infrared data transmitted from the light emitting element 17 is constituted of an IrDA header 22 and data 23.

In the embodiment, since Internet is accessed via the cellular phone 3 by the personal computer 1 as shown in FIG. 1, the data 23 of FIG. 3A is constituted of an Internet TCP/IP header 24 and data 25 as shown in FIG. 3B.

Figure 4:
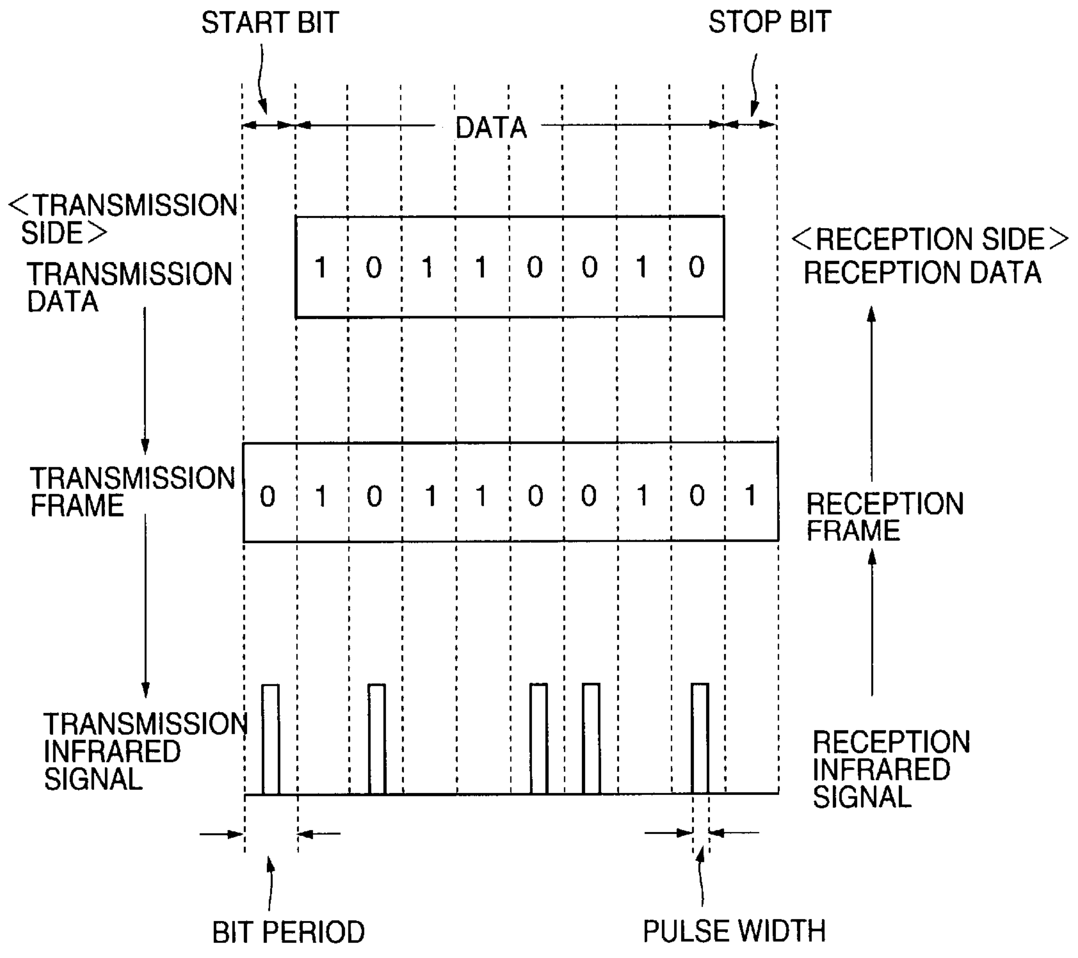
FIG. 4 is an explanatory view showing base band modulation for use in the embodiment shown in FIG. 2.

FIG. 4 is an explanatory view showing base band modulation for use in the embodiment shown in FIG. 2.

In the embodiment, during the communication by the infrared light the base band modulation is applied and the communication is performed.

In the base band modulation, as shown in FIG. 4, it is determined based on the value of the data to be transmitted whether the light emitting element 18 is allowed to emit light.

In the example shown in FIG. 4, when data (10110010) is transmitted, a transmission frame is formed by attaching a start bit (0) to the top of the data, and attaching a stop bit (1) to the end of the data, and the light emitting element 18 is allowed to emit light based on the values 1, 0 of the respective bits of the transmission frame. Specifically, when the bit value indicates 0, the infrared light is emitted onto a pulse, and when the bit value indicates 1, no infrared light is emitted.

Additionally, in the infrared transmission/reception apparatus of the embodiment, that is, in the cellular phone 3 shown in FIG. 2, the operation conforming the above-described IrDA standard is performed. Here, this IrDA standard will be described.

Figure 5:
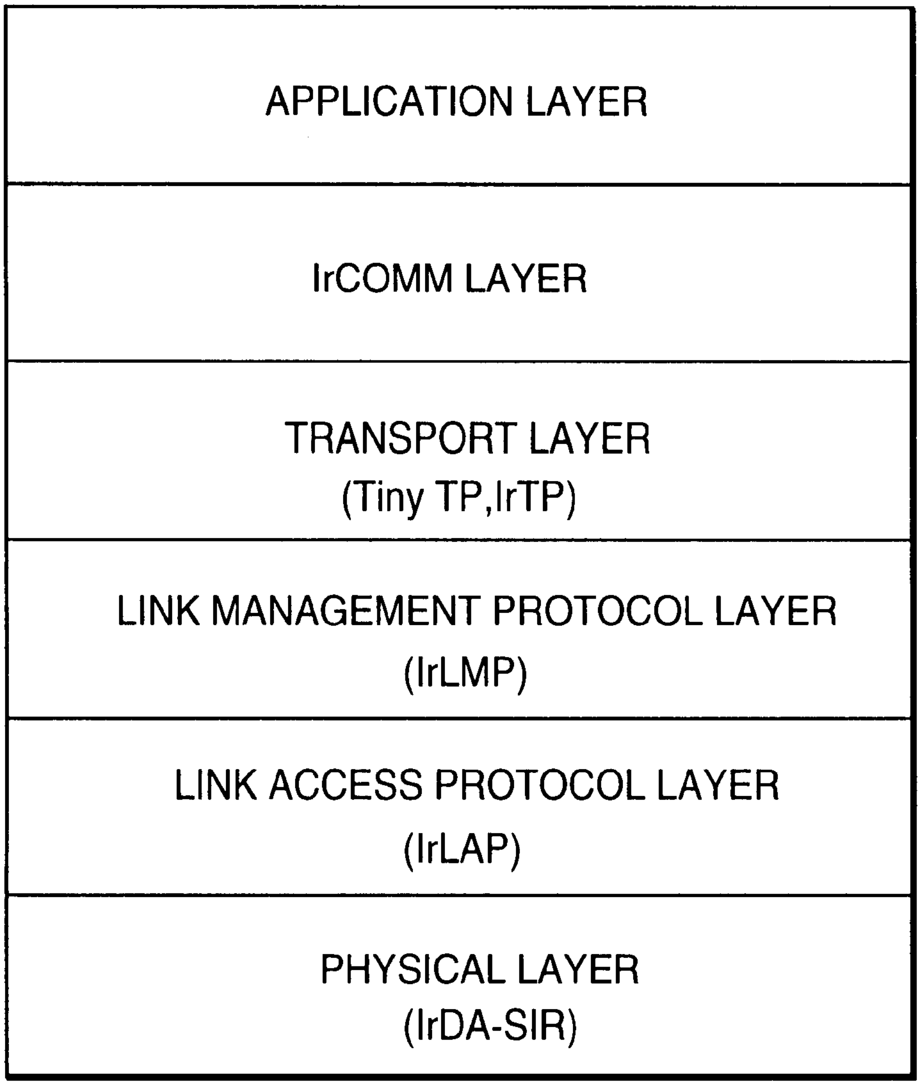
FIG. 5 is a diagram showing a plurality of layers which constitute the protocol regarding the infrared communication defined in the IrDA standard.

FIG. 5 is a diagram showing a plurality of layers which constitute a protocol regarding the infrared communication defined in the IrDA standard. In FIG. 5, the upper layers from the physical layer are software layers.

A link access protocol layer (IrLAP) shown in FIG. 5 is a protocol layer which defines basic data transfer conditions such as communication object search (hereinafter referred to as "device discovery"), transfer speed, data transfer unit and error processing. In the embodiment, the command and response defined in the IrLAP are used to perform a processing operation.

As described above, in the infrared transmission/reception apparatus conforming the IrDA standard, based on the definition of IrLAP, the calling side apparatus (hereinafter referred to as "primary station") transmits the station finding command, the apparatus able to receive this station finding command and perform the communication (hereinafter referred to as "secondary station") transmits a station finding response to indicate its presence, and subsequently the primary station and secondary station start the infrared communication. The transmission of this station finding command means the device discovery.

Figure 6:
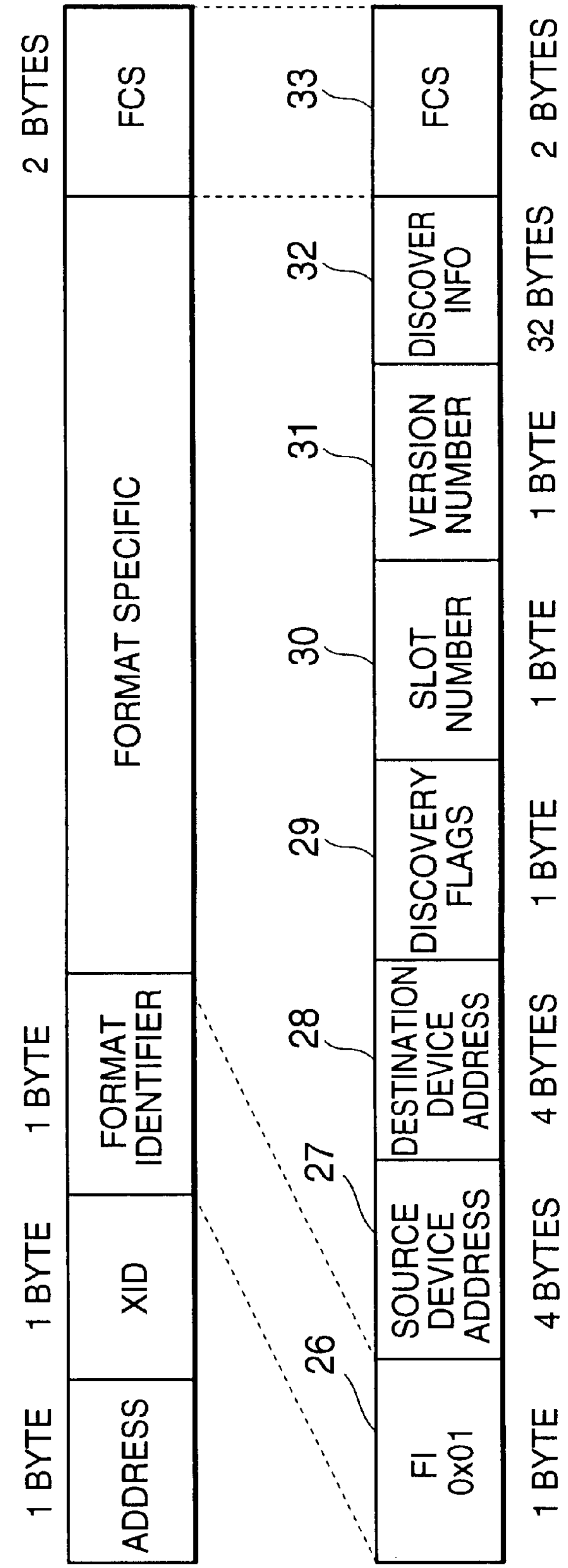
FIG. 6 is a diagram showing the data format of the station finding command.

FIG. 6 is a diagram showing the data format of the station finding command.

The station finding command is one type of a plurality of types XID frames, and this XID frame is a frame including information for device identification and communication condition setting, and also includes a function of performing "Exchange Identification (self information exchange)".

The XID frame includes an XID command frame, and an XID response frame which is a response with respect to the XID command frame, the XID command frame for the device discovery is here referred to as the station finding command, and the XID response frame with respect to the XID command frame for the device discovery is here referred to as the station finding response.

The XID command frame for the device discovery, that is, the station finding command is provided with the information as shown in FIG. 6 and transmitted.

A column 26 of FIG. 6 denotes Format Identifier, and is fixed to 0×01 for the device discovery frame.

A column 27 of FIG. 6 denotes Source Device Address, and a device address on an XID frame transmission side is set.

A column 28 of FIG. 6 denotes Destination Device Address, and the device address on an XID frame reception side is set. For the station finding command, however, since the reception-side device address is still unknown, a global address (0×FFFFFFFF) indicating all devices is set.

A column 29 of FIG. 6 denotes Discovery Flag, and the designation of a maximum slot number, and the like are performed via this column 28.

A column 30 of FIG. 6 denotes Slot Number, and a default slot number is designated by the column 29.

A column 31 of FIG. 6 denotes Version Number, and the version of IrLAP for transmitting the XID frame is set.

A column 32 of FIG. 6 denotes Discovery Info, and the information such as the service able to be provided on the XID frame transmission side are set.

A column 33 of FIG. 6 denotes Frame Check Sequence (FCS), and is added to check the transmission error of the frame unit.

Here, a concrete procedure of device discovery in the IrDA standard will be described.

(1) The searching side, that is, the primary station checks whether or not there is another apparatus having already transmitted the XID command frame in the vicinity, before transmitting the XID command frame.

(2) When the XID command frame from the other apparatus is detected, the information of "maximum slot number" is obtained from the XID command frame, and the "slot" (smaller than the maximum slot number) generated based on the information is utilized to transmit the XID response frame. Even when a plurality of apparatuses transmit the XID response frame, a time lag is made in the transmission timing of the XID response frame by utilizing the slot. Therefore, even when a plurality of XID response frames are returned to the XID command frame transmitter apparatus, the collision of the XID response frames can substantially be eliminated.

(3) If no XID command frame is received from the other apparatus for the past 500 ms, its own XID command frame is transmitted by designating the maximum slot number.

The present embodiment will next be described in more detail.

Figure 7:
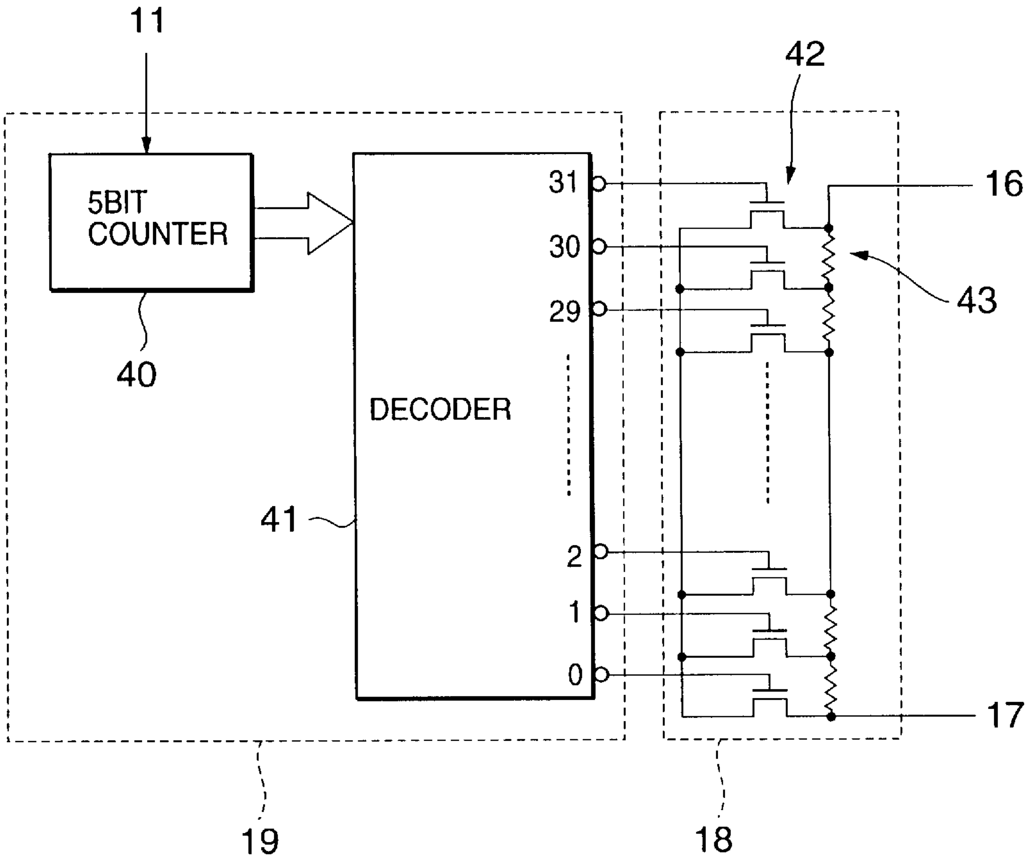
FIG. 7 is a block diagram showing a concrete example of the resistance controller and variable resistor shown in FIG. 2.

FIG. 7 is a block diagram showing a concrete example of the resistance controller 19 and variable resistor 18 shown in FIG. 2.

As shown in FIG. 7, the resistance controller 19 includes a counter 40 for changing a count value in response to an instruction from CPU 11, and a decoder 41 for changing the output signal based on the count value of the counter 40, and the variable resistor 18 is constituted of a plurality of switching elements 42 and a plurality of resistors 43. The switching element 42 is constituted, for example, of FET.

The counter 40 counts the number represented by 5 bits, and can change the count value in response to the instruction from CPU 40. The count value of the counter 40 is transferred to a decoder 41, and the decoder 41 changes the output signal based on this count value.

For example, when the count value transferred to the decoder 41 is 0, the signal is outputted only to a 0 pin of the decoder 41, and only the switching element 42 connected to the 0 pin is turned ON. Moreover, when the count value transferred to the decoder 41 is 1, the signal is outputted only to 1 and 0 pins of the decoder 41, and the switching elements 42 connected to the 1 and 0 pins are turned ON. Furthermore, when the count value transferred to the decoder 41 is n (n is an integer in a range 0 ≦n ≦31), the signal is outputted only to 0 to n pins of the decoder 41, and only the switching elements 42 connected to the 0 to n pins are turned ON.

In this constitution, the variable resistor 18 shown in FIG. 7 can take 32 resistivities based on the instruction from the CPU 11.

Next, a first operation example of the embodiment of the present invention will be described.

The first operation example shows a case in which the infrared transmission/reception apparatus of the present invention is the primary station and the transmission output of the primary station is controlled.

First, the outline of the first operation example will be described.

The apparatus in which the data link needs to be set transmits the station finding commands by the predetermined maximum slot numbers such as 1, 6, 8, 16 as the primary station, and makes a change for the other apparatus to transmit the station finding response with respect to the station finding command from the primary station.

The apparatus on the leading side to the data link setting as the primary station initializes itself, and confirms that no infrared data is received for 500 ms. This is a processing defined in the IrLAP, and intends to inhibit the already started infrared communication from being obstructed.

If no infrared data is received for 500 ms, the station finding command is transmitted for the predetermined number of slots at a constant time interval from slot number 1.

Upon receiving the station finding command, the other apparatus transmits a response to the primary station immediately after the station finding command transmitted from the primary station is received with the slot number in accordance with the result of the generated random number.

In the conventional art, no station finding command reaches the secondary station side. Therefore, when there is no station finding response, the primary station judges that no communication object exists, and ends the infrared communication.

In the first operation example, when no station finding response can be received, it is judged that the infrared transmission output is lacking and the station finding command cannot therefore reach the secondary station, and the CPU 11 commands the resistance controller 19 to reduce the resistivity of the variable resistor 18 entering the light emitting element 17 in series and to raise the transmission output level, so that the station finding command is transmitted again for the predetermined number of slots. By repeating this until the station finding response can be received, the current consumed on the light emitting element 17 can be minimized in a range in which the infrared communication is normally performed.

Moreover, in the conventional art, the infrared signal of a constant transmission output level is always transmitted. Even when the communication distance is apparently short, the infrared light with the excessive intensity is transmitted.

In this case, to solve the problem, in the first operation example, the transmission output level is lowered in reverse to the above-described constitution, and the current consumed on the light emitting element 17 can be minimized.

As a concrete operation, an output up flag is checked before the data link setting starts. This flag is set to rise when the transmission output is increased even once. When no transmission output increase is performed even once, and the transmission output is high, this flag does not rise, and therefore a processing shifts to lower the transmission output level of the light emitting element 17. Thereafter, the station finding command is transmitted again for the predetermined number of slots, and by repeating this until no station can be found, the transmission output is optimized immediately before no station can be found. To obtain this state, by raising the transmission output level of the light emitting element 17 this time, the station finding command may be transmitted again for the predetermined number of slots. Thereby, the current consumed on the light emitting element 17 can be minimized in the range in which the infrared communication can normally be performed.

Figure 8:
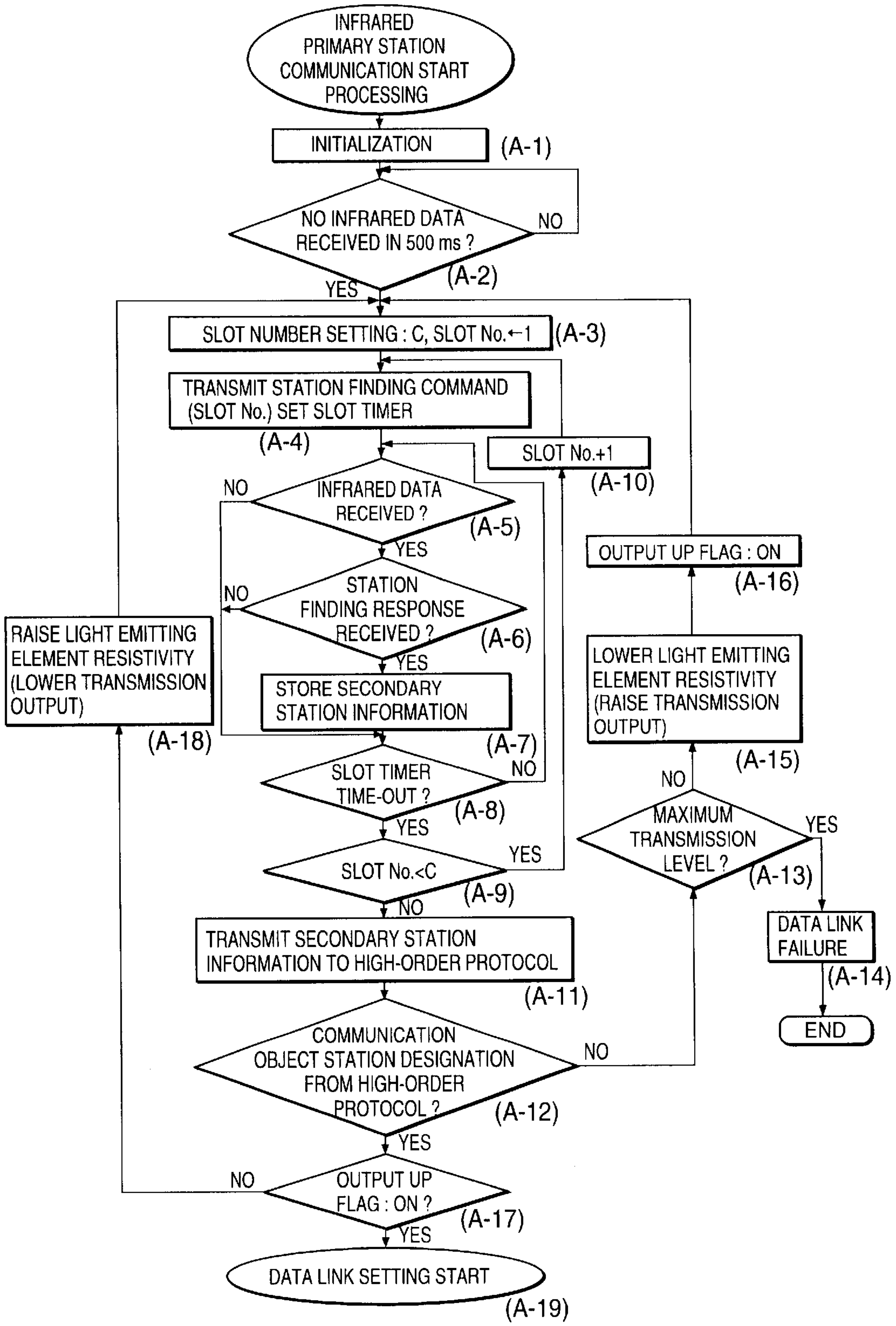
FIG. 8 is a flowchart showing the operation of the first embodiment of the present invention.

FIG. 8 is a flowchart showing the first operation example of the present invention.

When the infrared transmission/reception apparatus starts the communication as the primary station, first its own initialization is performed (A-1), and subsequently it is checked whether the infrared data from the other apparatus is received or not before a time elapse of 500 ms (A-2).

When the infrared data is received in 500 ms in the step (A-2), and the received data indicates the station finding command, the apparatus serves as the secondary station to transmit the station finding response for performing the infrared communication, but a processing performed when the apparatus serves as the primary station is described here, and the description of a processing performed when the apparatus serves as the secondary station is therefore omitted.

When no infrared data is received in 500 ms in the step (A-2), preparation is performed to generate the station finding command.

Here, the maximum slot number is set to C, and the number C of station finding commands are transmitted at predetermined time intervals. In the step (A-3), the maximum slot number is set to C, and 1 is set to the slot No. which is a parameter indicative of the slot number of the station finding command to be transmitted.

Subsequently, in step (A-4), the slot No.-th station finding command is transmitted, a slot timer is set and started/operated to measure a predetermined time until the next slot station finding command is transmitted, and the time measurement is started. When the first station finding command is transmitted, the transmission output is preferably set to the output obtained by setting the resistivity of the variable resistor 18 shown in FIG. 7 to the medium value of the resistivities able to be taken by the variable resistor 18.

Thereafter, the apparatus monitors the reception of the infrared data (A-5), checks whether the infrared data is the station finding response or not when the infrared data is received (A-6), and stores the station finding response data as secondary station information, for example, in the RAM 13 shown in FIG. 2 when the infrared data is the station finding response (A-7).

Subsequently, the apparatus checks whether or not the time measured by the slot timer operated/started in the step (A-4) reaches the predetermined time until the next slot station finding command is transmitted (A-8), and repeats the processing from the step (A-5) to (A-8) until the predetermine time elapses.

When the slot timer takes time-out in the step (A-8), and the predetermined time elapses, the apparatus sees if the slot No. as the parameter indicative of the slot number of the station finding command to be transmitted is smaller than the maximum slot number C, and checks whether the station finding commands are completely transmitted for the same number as the maximum slot number C (A-9). When the station finding commands have not been transmitted for the same number as the maximum slot number C yet, the apparatus adds 1 to the slot No. (A-10), and returns to the step (A-4) to continue the processing.

When the station finding commands have been transmitted by the same number as the maximum slot number C in the step (A-9), the secondary station information stored in the step (A-7) is transmitted to the high-order protocol of its own IrLAP (A-11), and it is checked from the high-order protocol whether the infrared communication object station is designated or not (A-12). The designation of the communication object station from the high-order protocol indicates that the received station finding response is normal.

When there is no designation of the communication object station from the high-order protocol in the step (A-12), the apparatus checks whether the transmission output of the presently transmitted station finding command has the maximum level (A-13), judges that the finding of the secondary station is unsuccessful when the output has the maximum level, and notifies the user that the setting of the data link is unsuccessful (A-14), and ends the processing. Means for notifying the user that the data link setting is unsuccessful may include buzzer sounding, sound transmission, display in a character, symbol, and the like, and any other means.

When the transmission output of the current transmitted station finding command does not have the maximum level in the step (A-13), the apparatus lowers the resistivity of the variable resistor 18 shown in FIG. 2 by the predetermined value to raise the transmission output of the station finding command to be transmitted subsequently (A-15), and turns on the output up flag indicating that the transmission output was raised in the step (A-15) (A-16). This output up flag is turned off in the initialization of the step (A-1). The flow then returns to the step (A-3) and continues the processing.

When there is the destination of the communication object station from the high-order protocol in the step (A-12), the apparatus sees if the output up flag is ON, and checks whether the optimum transmission output was transmitted (A-17).

When the output up flag is not ON in the step (A-17), even the lowering of the transmission output possibly results in the enabling of the communication. Therefore, the resistivity of the variable resistor 18 shown in FIG. 2 is raised by the predetermined value, the transmission output of the station finding command to be transmitted subsequently is lowered (A-18), and the flow then returns to the step (A-3) to continue the processing.

Moreover, when the output up flag is ON in the step (A-17), the communication with the secondary station is possible with the current transmission output, and it is seen that if the current transmission output lowers, the communication with the secondary station cannot be performed. Therefore, the data link is set with the current transmission output (A-19), and the infrared communication with the secondary station is started.

Figure 9:
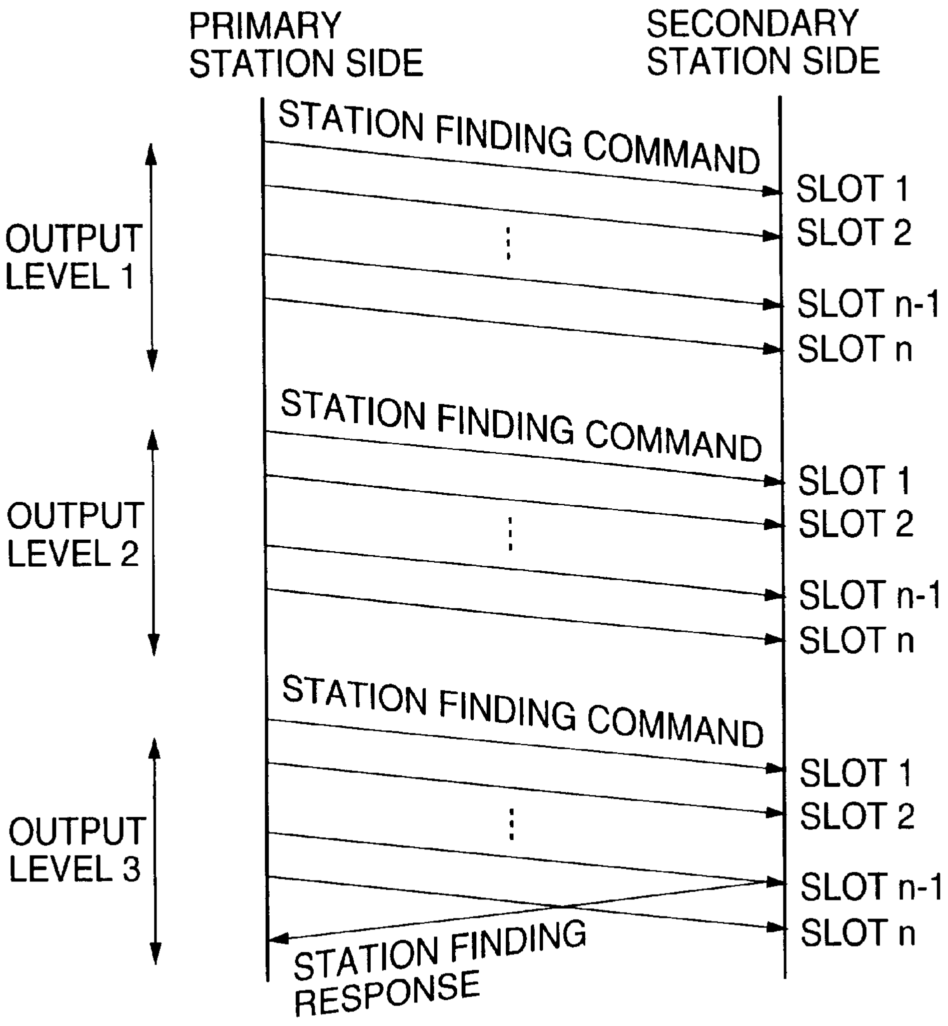
FIG. 9 is a timing chart showing a first example of infrared signal transmission/reception in the first embodiment of the present invention.

FIG. 9 is a timing chart showing a first case of infrared signal transmission/reception in the first operation example of the present invention.

Referring to FIG. 9, when the station finding commands are transmitted for the maximum slot number n from the primary station at a transmission output level 1, no station finding response is returned from the secondary station.

Therefore, the primary station raises the transmission output by one grade from the transmission output level 1, and again transmits the station finding commands for the maximum slot number n at a transmission output level 2. However, since there is no station finding response from the secondary station, the primary station raises the transmission output by one grade from the transmission output level 2, and again transmits the station finding commands for the maximum slot number n at a transmission output level 3.

Since the secondary station can receive the station finding commands transmitted at the transmission output level 3, the station finding response is transmitted as the response with respect to the randomly generated slot number ((n−1) in FIG. 9) of station finding commands. When this station finding response can be received, the primary station performs the subsequent communication at the transmission output level 3.

Figure 10:
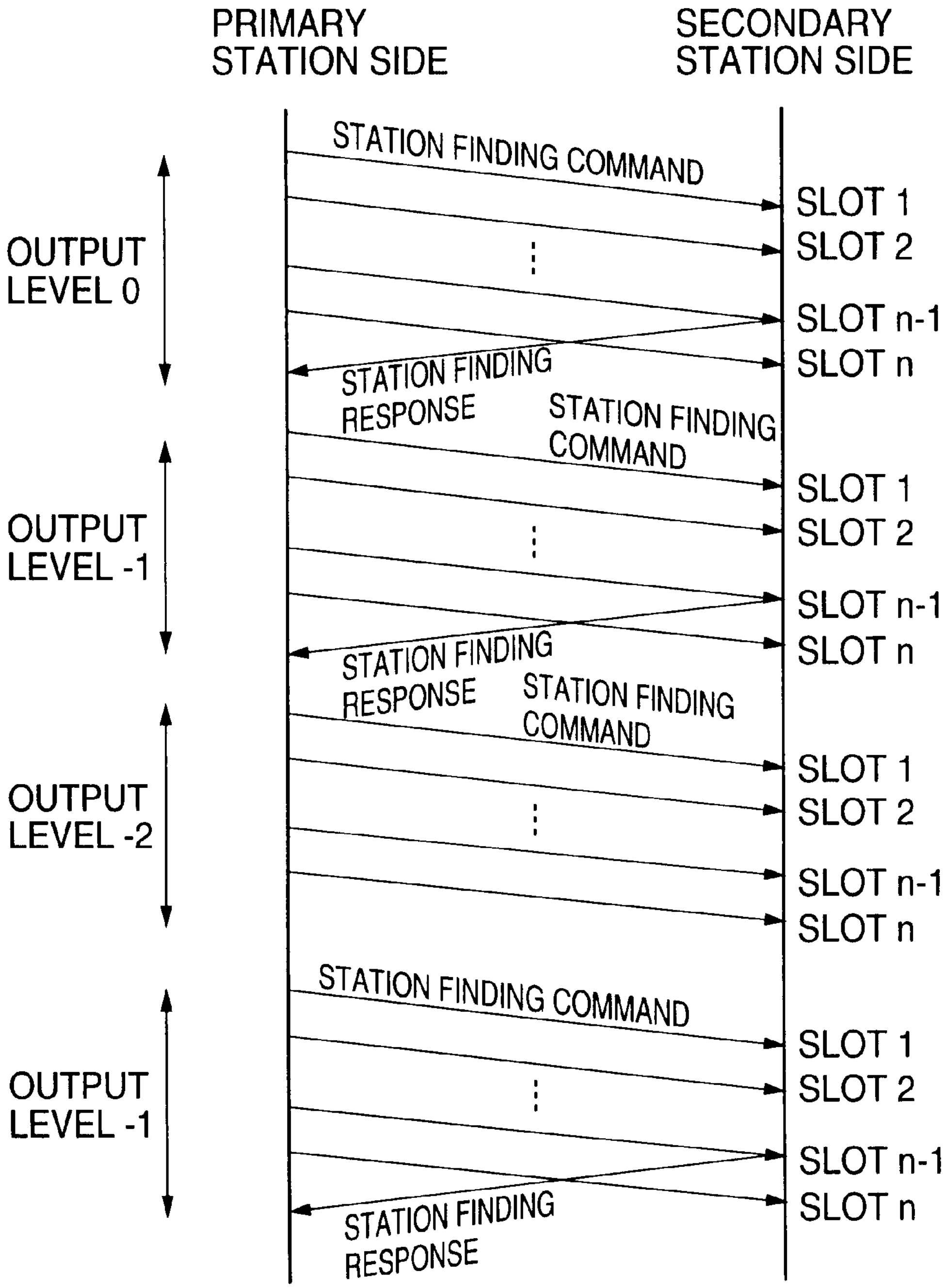
FIG. 10 is a timing chart showing a second example of the infrared signal transmission/reception in the first embodiment of the present invention.

FIG. 10 is a timing chart showing a second case of the infrared signal transmission/reception in the first operation example of the present invention.

Referring to FIG. 10, since the primary station transmits the station finding commands for the maximum slot number n at the transmission output level 0, and the secondary station can receive the station finding commands, the secondary station transmits the station finding response as the response with respect to the randomly generated slot number ((n−1) in FIG. 10) of station finding commands When the primary station receives the station finding response from the secondary station, and the output up flag is OFF, the primary station again transmits the station finding commands for the maximum slot number n at a transmission output level −1 obtained by lowering the transmission output by one grade from the transmission output level 0. The secondary station can receive the station finding command, and therefore transmits the station finding response as the response with respect to the randomly generated slot number of station finding commands.

When the primary station receives the station finding response with respect to the station finding command of the transmission output level −1, and the output up flag is still OFF, the primary station again transmits the station finding commands for the maximum slot number n at a transmission output level −2 obtained by lowering the transmission output by one grade from the transmission output level −1. The secondary station cannot receive the station finding command, and therefore transmits no response.

Since there is no station finding response with respect to the station finding command of the transmission output level −2, the primary station turns ON the output up flag, and again transmits the station finding commands for the maximum slot number n at the transmission output level −1 obtained by raising the transmission output by one grade from the transmission output level −2. The secondary station can receive the station finding command transmitted at the transmission output level −1, and therefore transmits the station finding response as the response with respect to the randomly generated slot number of station finding commands. Since the primary station can receive the station finding response, and the output up flag is ON, the primary station performs the subsequent communication at the transmission output level −1.

Additionally, in the first operation example shown in FIG. 8, in order to obtain the optimum transmission output, first the station finding command is transmitted at the substantially medium transmission output, and then the transmission output is increased/decreased, but the present invention is not limited to this, and the optimum transmission output may be obtained, for example, by first transmitting the station finding command with the maximum transmission output and subsequently lowering the transmission output, or the optimum transmission output may be obtained by first transmitting the station finding command with the minimum transmission output and subsequently raising the transmission output.

Next, a second operation example of the embodiment of the present invention will be described.

According to the above-described first operation example, the transmission output of the primary station is set to an optimum value based on the current distance between the primary station and the secondary station. Therefore, for example, if the distance between the primary station and the secondary station is broadened, the communication cannot be performed with the current primary station transmission output in some cases.

This second operation example provides means for restarting the communication even when the communication is disconnected, for example, because of the movement of the primary station or the secondary station and for other reasons after the optimum transmission output of the primary station is determined according to the above-described first embodiment and the infrared communication starts between the primary station and the secondary station.

This second operation example also shows a case in which the infrared transmission/reception apparatus is the primary station and the transmission output of the primary station is controlled.

Figure 11:
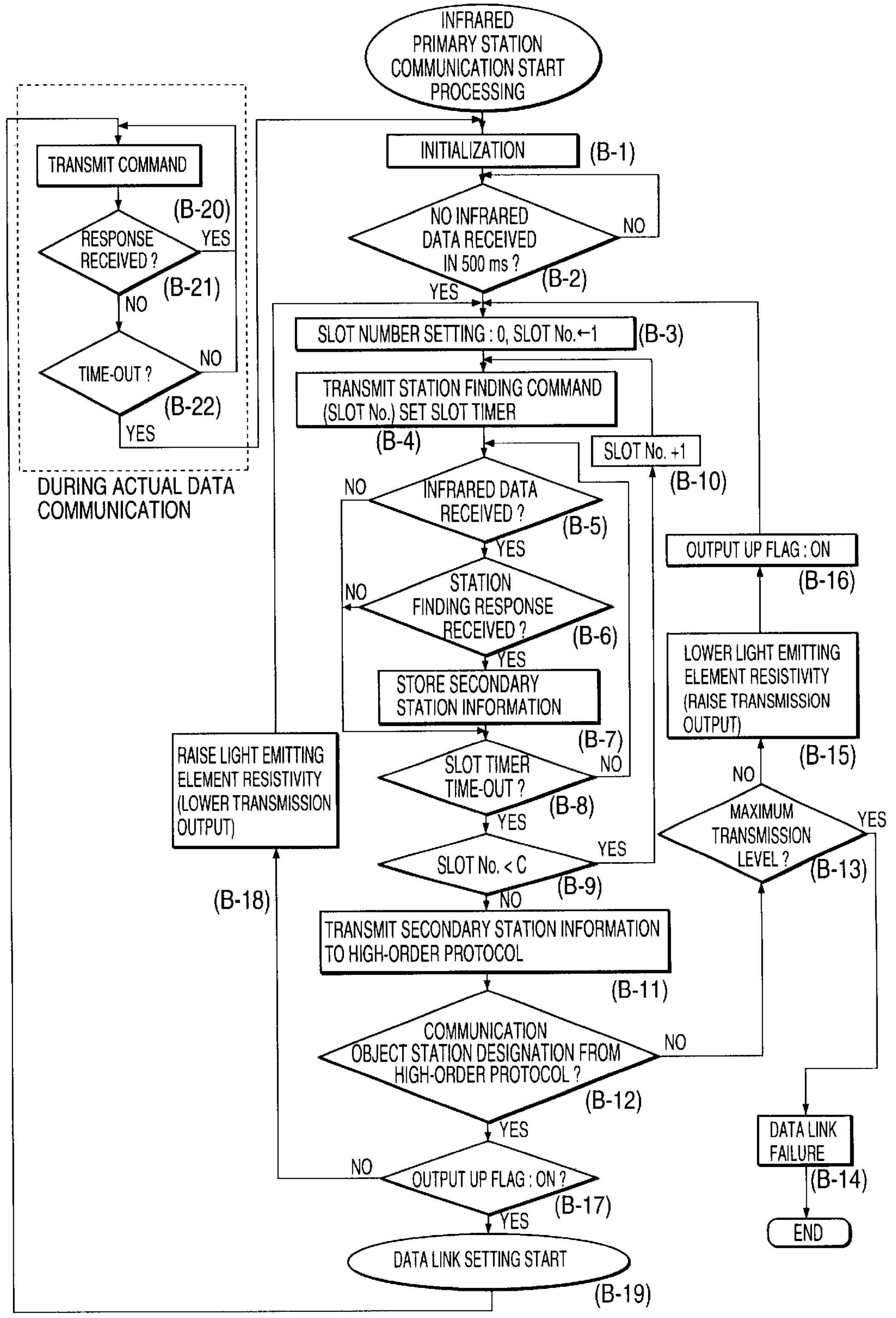
FIG. 11 is a flowchart showing the operation of a second embodiment of the present invention.

FIG. 11 is a flowchart showing the second operation example of the present invention.

In FIG. 11, since the steps (B-1) to (B-19) are similar to the steps (A-1) to (A-19) shown in FIG. 8, the description thereof is omitted.

When the optimum value of the primary station transmission output is determined, and the data link is set by the processing up to the step (B-19), the infrared communication starts between the primary station and the secondary station, and actual data communication for transmitting/receiving actual data which is not the control information is performed. During this actual data communication, the primary station transmits the command (B-20), and the secondary station transmits the response with respect to the command.

Although the primary station transmits the command (B-20), no response can be received (B-21) in a predetermined time (B-22). In this case, after the disconnection processing, the flow returns to the step (B-1) to again transmit the station finding command, obtain the optimum transmission output value of the primary station and restart the communication with the obtained transmission output value.

Figure 12:
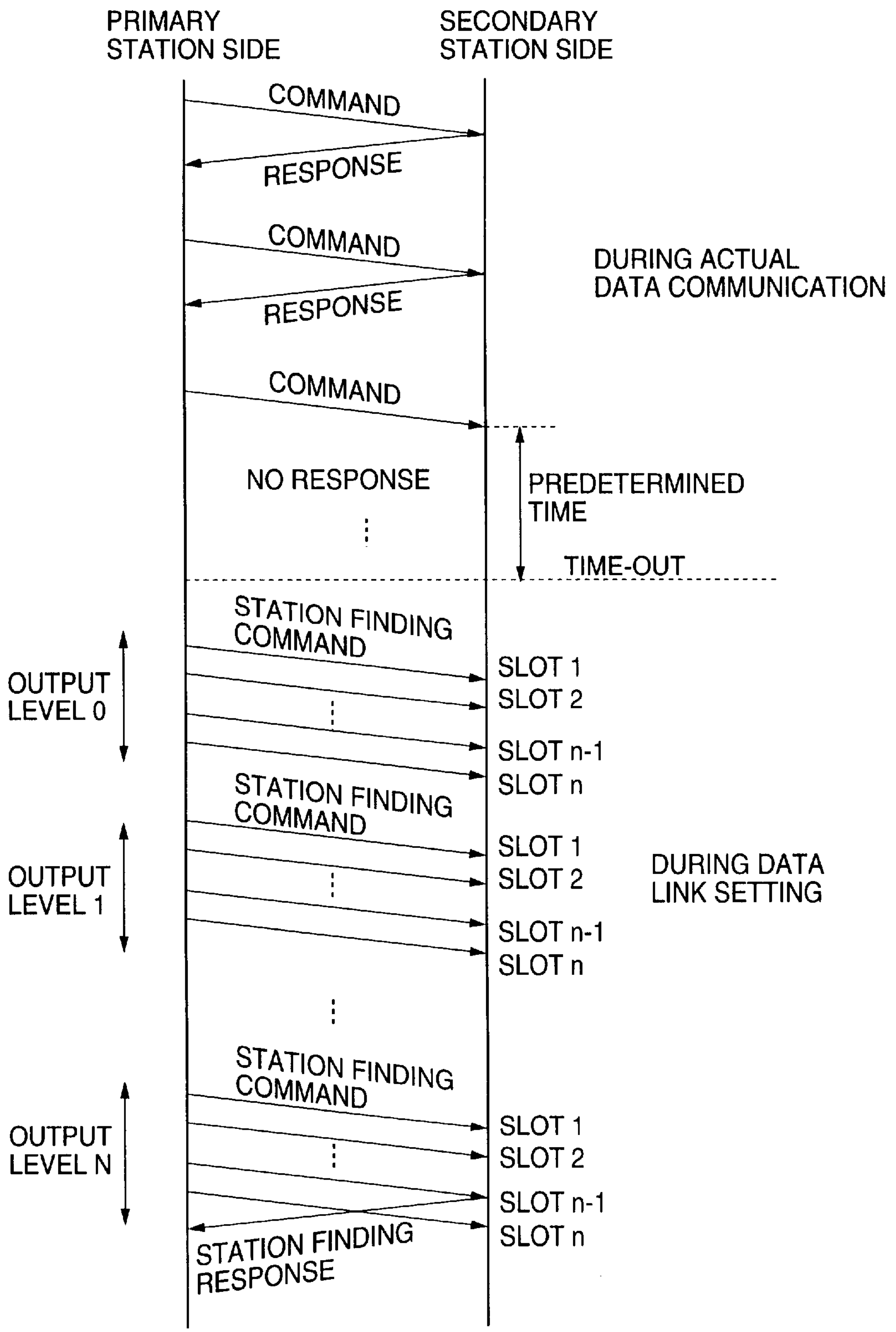
FIG. 12 is a timing chart showing the example of the infrared signal transmission/reception in the second embodiment of the present invention.

FIG. 12 is a timing chart showing a case of the infrared signal transmission/reception in the second operation example of the present invention.

Referring to FIG. 12, a state occurs in which no response is returned with respect to the command within a predetermined time during the actual data communication for transmitting the command from the primary station and returning the response from the secondary station.

In this case, the primary station once disconnects the line, transmits the station finding command via the transmission output with the predetermined intensity, repeats this by raising the transmission output until the station finding response is returned, and obtains the optimum transmission output value to restart the communication.

Additionally, as in the second operation example, when restarting, the transmission output of the first station finding command after the restart may be determined based on the transmission output value of the previous communication. For example, the optimum transmission output value can more quickly be obtained by raising the transmission output value by one grade from the transmission output value during the previous communication and transmitting the first station finding command after the restart.

Next, a third operation example of the embodiment of the present invention will be described.

This third embodiment shows a case in which the infrared transmission/reception apparatus of the present invention is the secondary station and the transmission output of the secondary station is controlled. Moreover, in the third embodiment, the infrared transmission/reception apparatus needs to perform a processing of repeating the transmission of the station finding command until the communication object primary station also receives the station finding response as in the first embodiment.

Figure 13:
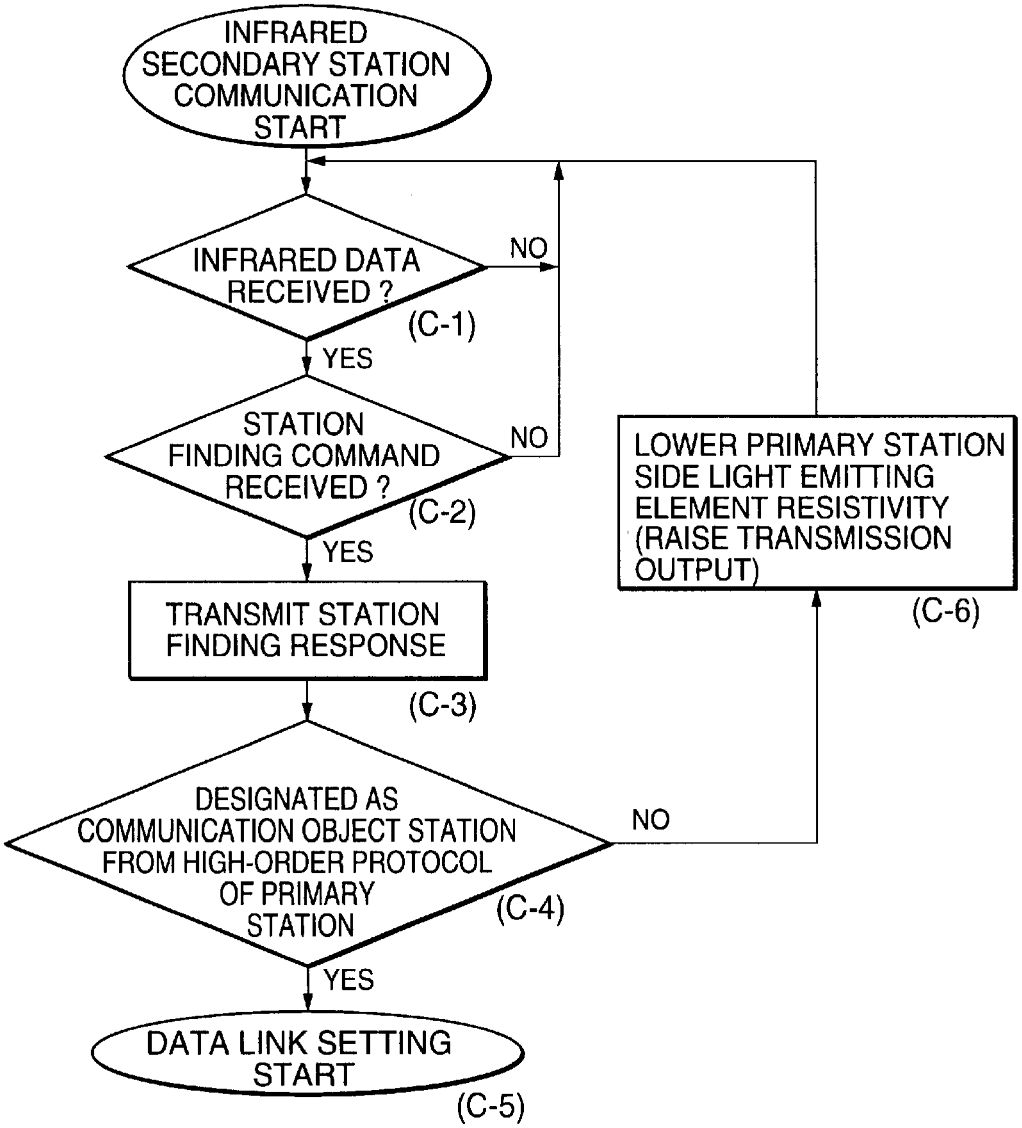
FIG. 13 is a flowchart showing the operation of a third embodiment of the present invention.

FIG. 13 is a flowchart showing the third operation example of the present invention.

The secondary station waits for the reception of the infrared data (C-1), and transmits the station finding response (C-3) when the received infrared data is the station finding command (C-2). In order to first transmit the station finding response, the variable resistor 18 shown in FIG. 2 is placed in a state with the maximum resistivity, that is, the transmission is performed with the minimum transmission output.

Thereafter, the processing similar to that of the step (A-12) of FIG. 8 is performed in the primary station (C-4), and the data link setting is started (C-5) when the primary station judges that the normal station finding response is received.

Although the station finding response is transmitted in the step (C-3), the data link setting does not start. In this case, after lowering the resistivity of the variable resistor 18 shown in FIG. 2 by one grade, and raising the transmission output for the subsequent transmission of the station finding response (C-6), the flow returns to the step (C-1) to wait for reception of the next station finding command.

Figure 14:
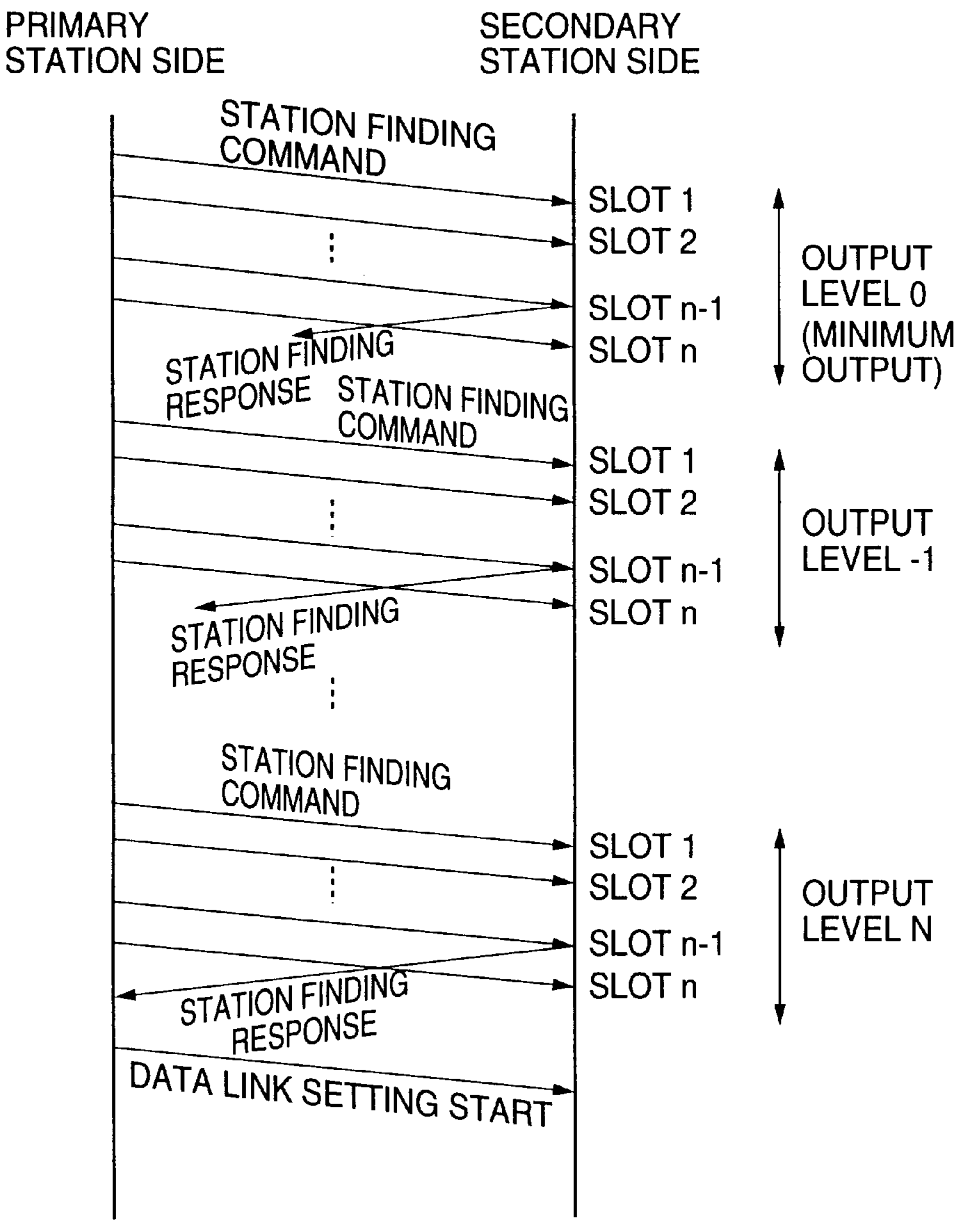
FIG. 14 is a timing chart showing the example of the infrared signal transmission/reception in the third embodiment of the present invention.

FIG. 14 is a timing chart showing a case of the infrared signal transmission/reception in the third operation example of the present invention.

Referring to FIG. 14, since the station finding command is received from the primary station, the secondary station returns the station finding response at the output level 0 as the minimum output, but the data link setting does not start.

In this case, since the primary station cannot receive the station finding response, the station finding command is again transmitted. The secondary station having received this station finding command transmits the station finding response at the output level 1 obtained by raising the transmission output by one grade from the previous output level 0.

When this is repeated, the secondary station transmits the station finding response at an output level N, and the secondary station can receive the normal station finding response for the first time, the primary station starts the data link setting, so that the secondary station also starts the data link setting. Moreover, it has turned out that the optimum transmission output of the secondary station has the output level N, and the subsequent communication is performed at the output level N.

What is claimed is:

1. An infrared transmission/reception apparatus having primary and secondary stations in an infrared communication system of IrDA standard in which said secondary station outputs a station finding response in response to a station finding command from said primary station, comprising:

first transmission means for transmitting a station finding command with a predetermined infrared transmission output;

second transmission means for transmitting the station finding command with the infrared transmission output which is higher than the infrared transmission output of the station finding command transmitted by said first transmission means when no station finding response with respect to the station finding command transmitted by the first transmission means is returned from the secondary station;

third transmission means for transmitting the station finding command with the infrared transmission output which is higher than the infrared transmission output of the previously transmitted station finding command when no station finding response with respect to the station finding command transmitted by the second transmission means is returned from the secondary station;

fourth transmission means for transmitting the station finding command with the infrared transmission output which is lower than the infrared transmission output of the station finding command transmitted by said first transmission means when the station finding response with respect to the station finding command transmitted by said first transmission means is returned from the secondary station;

fifth transmission means for transmitting the station finding command with the infrared transmission output which is lower than the infrared transmission output of the previously transmitted station finding command when the station finding response with respect to the station finding command transmitted by the fourth transmission means is returned from the secondary station;

first control means for again executing the processing by said fifth transmission means when the station finding response with respect to the station finding command transmitted by the fifth transmission means is returned from the secondary station;

second control means for again executing the processing by said fourth transmission means when no station finding response with respect to the station finding command transmitted by said third transmission means, said fourth transmission means or said fifth transmission means is returned from the secondary station; and communication means for performing a subsequent communication by using a infrared transmission output for such a station finding command as returning the station finding response from the secondary station when the station finding response with respect to the station finding command transmitted by said second transmission means or said third transmission means is returned from the secondary station.

2. The infrared transmission/reception apparatus according to claim 1, further comprising notification means for notifying a user of a data link failure when the infrared transmission output of the previously transmitted station finding command is the infrared transmission output of a maximum level in said third transmission means.

3. An infrared transmission/reception method for an infrared transmission/reception apparatus having primary and secondary stations in an infrared communication system of IrDA standard in which said secondary station outputs a station finding response in response to a station finding command from said primary station, the method comprising the steps of:

a first step of transmitting a station finding command with a predetermined infrared transmission output;

a second step of transmitting the station finding command with the infrared transmission output which is higher than the infrared transmission output of the station finding command transmitted by said first step when no station finding response with respect to the station finding command transmitted by the first step is returned from the secondary station;

a third step of transmitting the station finding command with the infrared transmission output which is higher than the infrared transmission output of the previously transmitted station finding command when no station finding response with respect to the station finding command transmitted by the second step is returned from the secondary station;

a fourth step of transmitting the station finding command with the infrared transmission output which is lower than the infrared transmission output of the station finding command transmitted by said first step when the station finding response with respect to the station finding command transmitted by said first step is returned from the secondary station;

a fifth step of transmitting the station finding command with the infrared transmission output which is lower than the infrared transmission output of the previously transmitted station finding command when the station finding response with respect to the station finding command transmitted by the fourth step is returned from the secondary station;

a sixth step of again executing the processing by said fifth step when the station finding response with respect to the station finding command transmitted by the fifth step is returned from the secondary station;

a seventh step of again executing the processing by said fourth step when no station finding response with respect to the station finding command transmitted by said third step or said fourth step or said fifth step is returned from the secondary station; and an eighth step of performing a subsequent communication by using an infrared transmission output for such a station finding command as returning the station finding response from the secondary station when the station finding response with respect to the station finding command transmitted by said second step or said third step is returned from the secondary station.

4. The infrared transmission/reception method according to claim 3, further comprising a ninth step of notifying a user of a data link failure when the infrared transmission output of the previously transmitted station finding command is the infrared transmission output of a maximum level in said third step.

5. An infrared transmission/reception apparatus having primary and secondary stations in an infrared communication system of IrDA standard in which said secondary station outputs a station finding response in response to a station finding command from said primary station, comprising:

plural transmission means for transmitting a station finding command with a predetermined infrared transmission output such that the station finding command is retransmitted with output which is higher than an initial station finding command when no station finding response is returned from the secondary station and such that the station finding command is retransmitted with the infrared transmission output which is lower than the initial station finding command when the station finding response is returned from the secondary station;

plural control means for again executing the processing by one of said plural transmission means when the station finding response is returned from the secondary station, until a station finding response is no longer returned and for again executing the processing by another one of said plural transmission means when no station finding response is returned from the secondary station, until a station finding response is returned; and communication means for performing a subsequent communication by using an infrared transmission output for such a station finding command as returning the station finding response from the secondary station when the station finding response is returned from the secondary station.

* * * * *